United States Patent [19]

LaValley

[11] 4,383,877
[45] May 17, 1983

[54] METHOD OF MAKING AN ANNULAR VALVE HOUSING FOR A ROTARY DRUM FILTER

[75] Inventor: Richard W. LaValley, Vancouver, Wash.

[73] Assignee: LaValley Industrial Plastics, Inc., Vancouver, Wash.

[21] Appl. No.: 231,236

[22] Filed: Feb. 4, 1981

[51] Int. Cl.$^3$ .............................................. B32B 31/14
[52] U.S. Cl. ..................................... 156/155; 34/110; 156/173; 162/372; 210/402; 210/404; 264/221; 264/317; 264/DIG. 44
[58] Field of Search .......................... 34/110; 29/423; 156/155, 173; 162/314, 357, 372; 210/402, 404; 264/221, 313, 317, DIG. 44

[56] References Cited

U.S. PATENT DOCUMENTS

| | | |
|---|---|---|
| 3,363,774 | 1/1968 | Luthi .................................... 210/404 |
| 3,577,315 | 5/1971 | Franklin ........................... 156/172 X |
| 3,579,422 | 5/1971 | Minick et al. .................... 210/402 X |
| 3,794,178 | 2/1974 | Luthi .................................... 210/404 |
| 3,894,899 | 7/1975 | Konopatov et al. ............. 210/404 X |

Primary Examiner—Edward C. Kimlin
Assistant Examiner—Robert A. Dawson
Attorney, Agent, or Firm—Klarquist, Sparkman, Campbell, Leigh, Whinston & Dellett

[57] ABSTRACT

A substantially entirely plastic rotary drum filter is made by applying a layer of plastic to the interior surface of a cylindrical mold, removing the mold, and applying at least one additional layer of plastic to the exposed exterior surface of the shell formed by the first layer. A plastic annular axial valve housing with plural valve chambers and a central valve receiving space is mounted to a head assembly at the head end of the shell. A tail assembly closes the opposite end of the shell to form the drum. Circumferentially spaced interior plastic bucket sections are positioned midway between the head and tail assemblies. Upon the periodic application of a vacuum to the valve chambers, filtrate is delivered from the exterior of the drum through an associated bucket and plastic drainage conduit to an associated valve chamber. Plastic reinforcing rings strengthen the drum along its length and in the region of the bucket section. In making the plastic annular valve housing, radially extending circumferentially spaced valve chamber side wall members are positioned about the axis of the valve receiving space. Dissolvable molds are inserted at least partially in the space between the members with an outwardly projecting valve chamber inlet defining neck portion. Plastic is applied to these molds and interconnects selected marginal edges of the side wall members so as to form the outer shell of the annular valve housing.

14 Claims, 26 Drawing Figures

METHOD OF MAKING AN ANNULAR VALVE HOUSING FOR A ROTARY DRUM FILTER

BACKGROUND OF THE INVENTION

1. Field of the Invention

The present invention relates to rotary drum filters and particularly to those of the pipe machine type having an axial annular valve housing at one end of the drum. More specifically, the invention relates to a method of making a substantially entirely plastic rotary drum filter and to a method and mold for making an annular valve housing for such a drum filter.

2. Description of the Prior Art

Rotary drum filters of the pipe machine type are commonly used in the pulp and paper making industry to separate wood pulp from its filtrate. A drum filter comprises a rotary drum partially submerged in a tank of pulp slurry. The drum has axially extending filtrate channels or compartments spaced about its periphery, with such compartments covered by a filter screen. These filtrate compartments communicate through bucket sections, drainage conduits, and an annular valve housing in communication with a source of subatmospheric pressure. A stationary valve positioned within a valve seat portion of the valve housing controls the application of subatmospheric pressure to the respective valve chambers of the housing. As the drum rotates abouts its axis with subatmospheric pressure applied, the screen rotates through the pulp slurry and collects a wet mat of fibers from the slurry. As the screen emerges from the tank, filtrate is drawn through the screen and compartments into the bucket sections. From the bucket sections the filtrate passes through drainage conduits and valve chambers from where it is discharged through suitable piping from the drum and thus liquid is removed from the mat. As the drum continues its rotation, the stationary valve member periodically blocks off the filtrate compartments from the source of subatmospheric pressure thereby enabling removal of the pulp mat from the surface screen.

A conventional pipe machine type rotary drum filter as described above is shown in U.S. Pat. No. 3,363,774 of Luthi. Heretofore, such rotary filter drums and their components have commonly been constructed virtually entirely of metal such as stainless steel or titanium. These metal drums are relatively much more expensive and are more time consuming to construct in comparison with drum filters of the present invention. Furthermore, these metal components tend to rapidly wear because of their continual exposure to highly abrasive and often chemically active filtrate liquids, thereby greatly reducing the operating life of such drums.

In attempts to partially solve this corrosion problem, rotary drum filters have been manufactured with certain components of plastic, and particularly those components attached to the outer surface of the deck of the drum. U.S. Pat. Nos. 3,577,315 of Franklin, 3,579,422 of Minick, et al. and 3,794,178 of Luthi, as well as the above-mentioned Luthi patent exemplify this approach. Nevertheless, insofar as known, such drums include substantial metallic sections which are subject to corrosion.

Also, because the metallic sections are usually integrated with the structural members of the drum, when they wear out, the entire drum must be taken out of service and either replaced with a new drum or shipped to a maintenance facility for repair. Whether the drum is replaced or repaired, either choice is expensive and entails considerable lost production time.

In addition, during the course of repairing such drums, it has been known to clean, refurbish, and coat the corroded metallic surfaces with a plastic material to shield them from the corrosive filtrate liquids after the repair process is complete. However, composite drums of metal coated with a corrosion resistant plastic are somewhat costly to produce. Furthermore, cracks in the plastic coating can result during operation of the drum. This allows the corrosive filtrate to reach the metal components and contribute to the breakdown and subsequent repair of the drum. Drums of the type disclosed in the above-mentioned Luthi patents have been repaired in this manner.

In addition, U.S. Pat. No. 3,894,899 of Konopatov, et al. mentions a honeycombless rotary drum filter in which binder impregnated glass fabric is used in its manufacture. However, such a drum differs structurally from the drum of the present invention and is understood to include a central metal axle extending between its ends. In addition, the method of manufacturing such a drum is understood to differ from the method of the present invention.

Furthermore, none of the aforementioned devices are understood to include a plastic annular valve housing with plural valve chambers. In contrast, the annular valve housings in Luthi are understood to be of cast metal. As result, the surfaces are apparently more porous than the surface of the plastic annular valve housing resulting from the method of this invention. This greater porosity results in more surfaces on which the corrosive filtrate liquid can work and makes them wear faster.

Accordingly, there is a need for an efficient method of manufacturing a plastic rotary drum filter, particularly one of the pipe machine type. Furthermore, there is a need for a method of manufacturing a plastic annular valve housing which is segmented into plural valve chambers.

SUMMARY OF THE INVENTION

The present invention is a method of manufacturing a substantially entirely plastic rotary drum filter and a mold and method of manufacturing a plastic annular axial valve housing for such a drum filter. As a more specific aspect, the invention is a method of making a substantially entirely plastic drum filter of the pipe machine type having a plastic annular axially positioned valve housing which is segmented into plural separate valve chambers. Such a rotary drum filter is characterized by plastic bucket sections which collect filtrate liquid from the external surface of the drum with each such bucket section being coupled by an associated plastic drainage conduit to one of the valve chambers. Hence, filtrate liquid within the bucket sections are delivered, under the influence of a vacuum, through the associated valve chamber and annular valve housing to a collection tank or area. The shell of the drum may be made by coating the interior surface of a cylindrical mold with at least one layer of plastic, stripping the mold from the resulting shell, and coating the exterior surface of the shell with at least one additional layer of plastic. The shell is reinforced with special plastic reinforcing members both along its length and in the region of the bucket sections. The annular valve housing is made by positioning plastic radial valve side wall members about the circumference of a central valve receiving space of the valve housing, inserting dissolvable filtrate molds at least partially into the space between the side wall members, applying plastic to the dissolvable molds and to span selected marginal edges of the side wall members to form the shell of the annular valve housing, and thereupon dissolving the molds. The annular valve housing prefabricated in this manner may be installed to the rotary drum filter during its manufacture.

Accordingly, a primary object of the present invention is to provide a method of manufacturing a rotary drum filter which is substantially entirely of a plastic material.

Another object of the invention is to provide a method of making a plastic rotary drum filter of the pipe machine type.

A further object of the invention is to provide a method of manufacturing a plastic annular valve housing for a rotary drum filter.

A still further object of the invention is to provide a method of manufacturing a rotary drum filter which is less costly than prior art methods.

It is another object of the invention to provide a method of manufacturing a corrosion resistant rotary drum filter.

A further object of the invention is to provide a method of manufacturing a rotary drum filter which is faster than prior art methods.

These and other objects, features and advantages of the present invention will become apparent with reference to the following description and drawings.

DETAILED DESCRIPTION

General Description of a Rotary Drum Filter

Figure 18:
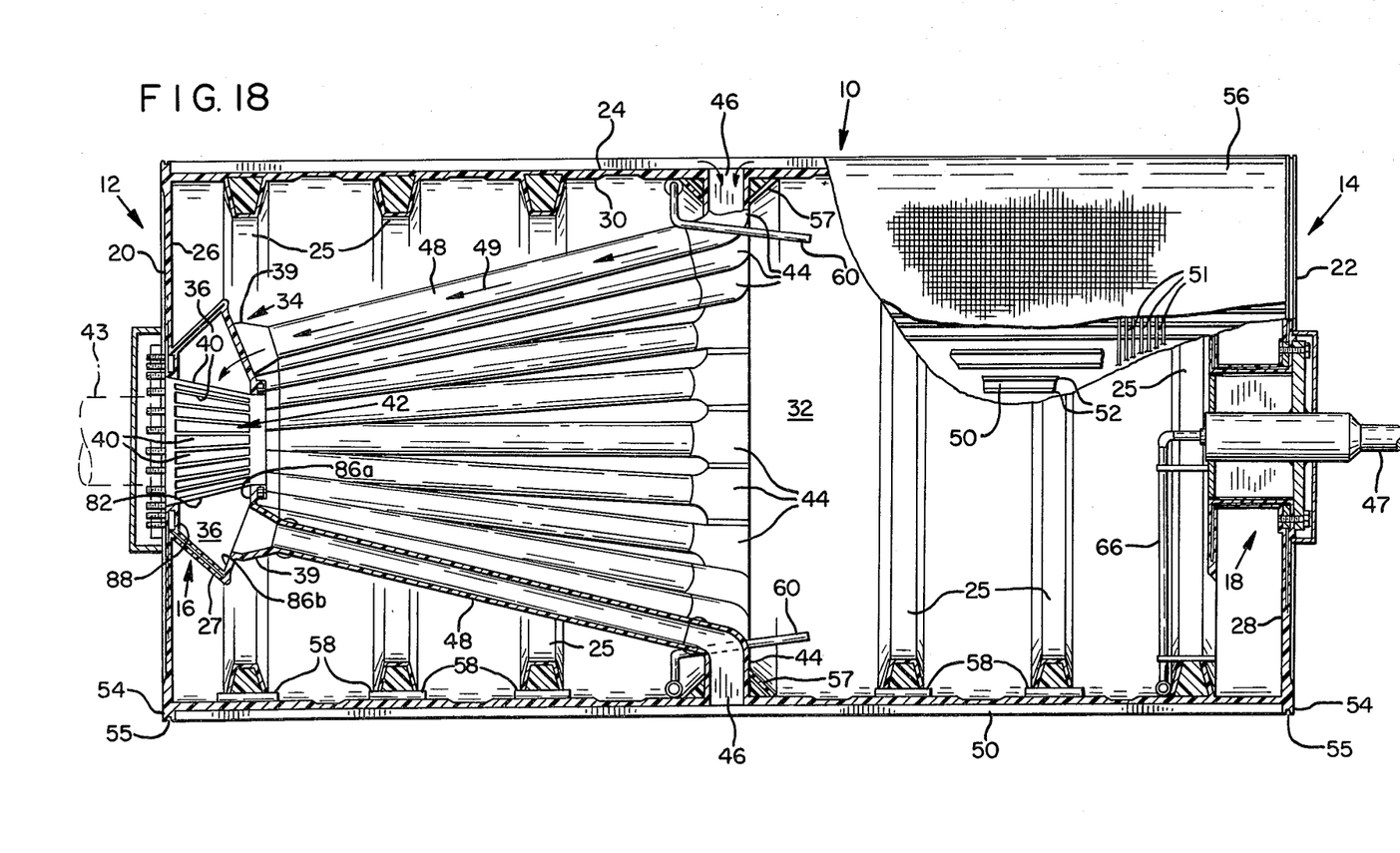
FIG. 18 is a side elevation view, partially in section, of the completed rotary drum filter.
Figure 19:
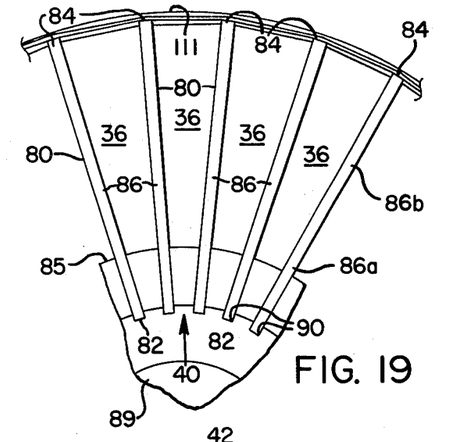
FIG. 19 is a fragmentary view of side wall members of a partially constructed annular valve housing and taken from the tail end of the housing.

Referring to FIG. 18, a rotary drum filter of the pipe machine type, to which the method of the present invention may be employed to construct, includes a generally cylindrical drum 10 having a head end 12 and tail end 14. A drive head assembly 16 is positioned at the head end of the drum while a tail assembly 18 is located at the tail end. Flat opposite end walls 20, 22 of the respective head and tail assemblies are joined together by a generally cylindrical deck portion 24 to form the drum. The inner surfaces 26, 28 of respective end walls 20, 22, together with the inner surface 30 of deck 24 define a cylindrical chamber 32 within the drum filter.

An annular axial valve housing 34 is mounted to drive head assembly 16 and defines plural valve chambers 36. Each such chamber 36 defines a filtrate flow passageway from a respective filtrate receiving inlet 39 through a filtrate discharge outlet 40 to an axial passage defined by a valve seat 42 of the annular valve housing. This latter valve passage communicates with an external pipe 43 which in turn is connected to a source of sub-atmospheric pressure (not shown). Plural generally hollow bucket sections 44, spaced circumferentially about the interior surface 30 of deck 24, are provided approximately midway between end walls 20, 22. Each such bucket section 44 communicates through an opening 46 to the exterior of the drum. In addition, each bucket section is associated with a respective one of the valve chambers 36. Plural interior drainage conduits or tubes 48 are provided to complete a filtrate discharge path, indicated by arrows 49, between the associated buckets and valve chambers.

Drum 10 is rotatably mounted by a tail shaft 47 at tail end 14 by a support (not shown). The drum is mounted at its opposite end by conduit 43 which forms a trunnion extension of drive head assembly 16.

Typically, the deck surface 24 supports a set of circumferentially spaced apart axially extending channels 50 with radially extending ribs 52. The ribs are covered with circumferentially wound wire 51, which supports a surface filter screen 56 and defines the filter medium of the drum. The circumferentially spaced ribs 52 define axially and radially extending sets of filtrate compartments, closed at their axially outer ends by end ring flanges 54 and communicating through openings 46 to the interior of the bucket sections. Valve seat 42 receives a conventional substantially stationary valve (not shown) which extends through a predetermined arc of the valve seat.

In operation, drum 10 is partially submerged in a tank typically containing a pulp slurry. As the drum rotates the valve member periodically and selectively blocks off each valve chamber 36 from communication with subatmospheric pressure from pipe 43. This permits the removal of a pulp mat which forms on the exterior surface of the screen. This mat is formed as follows: As the drum rotates into the slurry, a partial vacuum is applied to those filtrate compartments not blocked by the valve member. This vaccum causes pulp fibers in the slurry to collect on the surface of the filter screen 56. As the screen surface emerges from the slurry, the vacuum continues to be applied. This draws filtrate liquid from the mat through the compartments defined by ribs 52 and through openings 46, bucket sections 44, conduits 48, valve chambers 36, valve seat 42, and pipe 43 to a filtrate tank or other collection area. As each valve chamber 36 becomes sealed off from the continuously applied vacuum, by the stationary valve member, the de-watered pulp mat can be removed, as by a doctor blade from the screen surface.

Deck 24 is reinforced with axially spaced reinforcing rings 25 which extend radially inwardly from the interior surface 30 of deck 24. Bucket sections 44 are also reinforced by annular reinforcing members 57. Although internal chamber 32 is designed to be fluid-tight, filtrate liquid occasionally will leak into this chamber. To prevent the accumulation of this liquid within chamber 32, tubes 58 are provided transversely through reinforcing ribs 25 and positioned adjacent the interior surface 30 of the deck. These tubes provide a flow path for the leakage liquid from the head end of the drum toward the tail end. In addition, crossover tubes 60 are provided for carrying the leakage fluid past the bucket sections 44. A filtrate leakage pick-up tube 66 having an intake adjacent surface 30 of the drum is positioned at the tail end of the drum and connected to a pump (not shown) through which the leakage filtrate is pumped and removed from the interior of the drum.

Except for differences in the construction of the reinforcing rings 25 and in the reinforcing members 57 utilized to reinforce the bucket sections 44, the components of the above drum are substantially identical in size and shape to the components of prior art rotary drum filters. However, all of the foregoing structural drum members are usually made of a chemically resistant metal such as stainless steel. In contrast, in the method of the present invention, substantially all of the components of the drum filter are of a corrosion resistant plastic material, such as fiber glass reinforced polyester resin. In addition, the method of manufacturing a plastic annular valve housing and rotary drum filter of the present invention is previously unknown.

Detailed Description of the Method of Making the Annular Valve Housing

The method of making an annular valve housing 34 for a rotary drum filter which directs filtrate from conduits 48 to a filtrate collecting area is best understood with reference to FIGS. 19 through 26.

In general, the method includes the initial step of positioning radial plastic side wall members, such as plates 80, about the axis of the valve receiving space or seat 42. The radially inward edges 82 of plates 80 are planar and sloped to define the limits of a frustoconical valve receiving space with the narrowest diameter of the space being positioned tailward of the widest diameter. In addition to edge 82, each plate 80 is bounded by a radially outer planer edge 84, a headmost planar edge 88 (FIG. 26) and a tailmost edge 86 which includes first and second planar edge sections 86a, 86b. These plates are shaped such that edges 82 and 84 diverge from one another moving in a tailward direction. In addition, as best seen in FIG. 18, moving in a radially outward direction, edges 86 and 88 diverge along edge section 86a, and then converge along edge section 86b. Hence, plates 80 define side walls of a chamber 36 of a corresponding shape and improve fluid flow characteristics.

A frustoconical plug 89 is provided to occupy the valve receiving space 42 and retain the plates 80 in position. The central plug has plural circumferentially spaced slots 90, with these slots having an axis in a plane containing the axis of the plug. The inward edges 82 of plates 80 are inserted in respective slots 90 to retain the plates in position.

An individual dissolvable filtrate mold is provided for each valve chamber 36. Exemplary molds 92, 92a and 92b are illustrated in FIGS. 21 through 24. Each such mold includes a respective neck 94, 94a and 94b sized and shaped to define the limits of a filtrate receiving inlet 39 (FIG. 18). In addition, each mold includes a respective body 96, 96a, 96b sized for insertion between the plates 80 so that they fill and hence define the limits of at least a portion of the respective valve chamber 36.

Figures 21, 22, 23, 24, 25, 26:
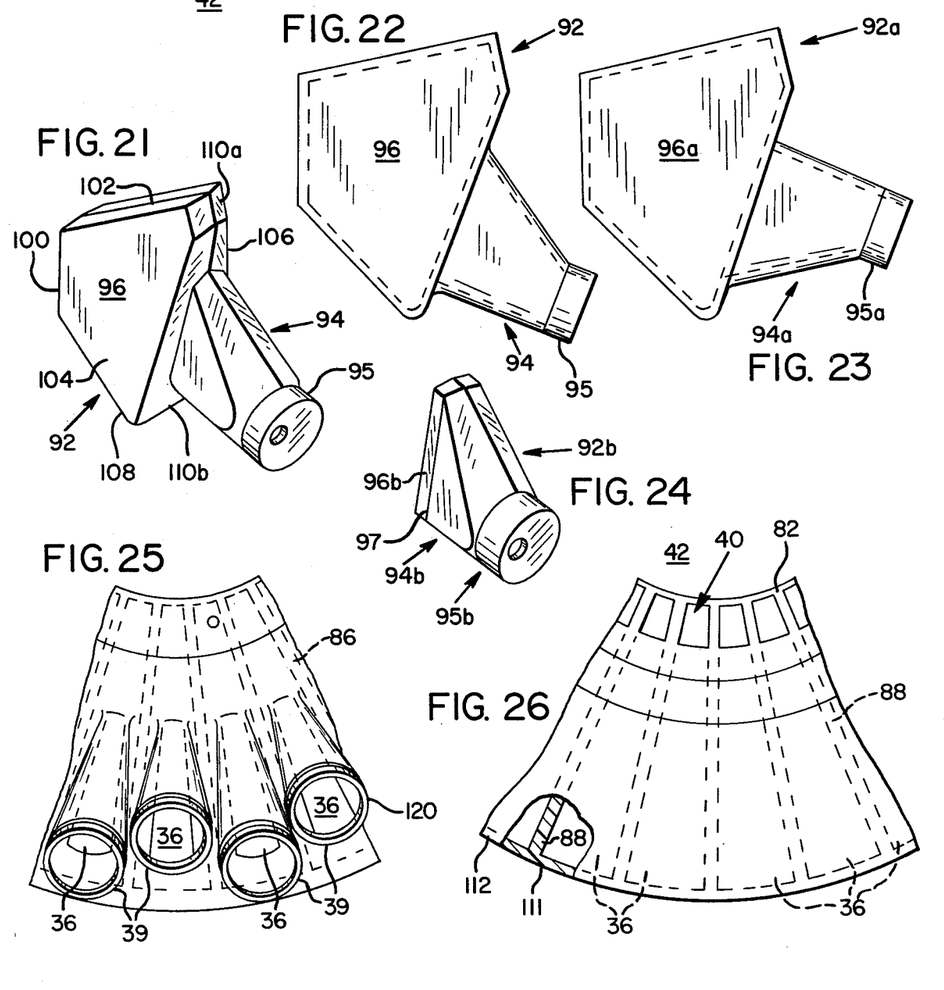
FIG. 21 is a perspective view of one form of dissolvable mold for a valve chamber of the annular valve housing.
FIG. 22 is a side elevational view of the mold of FIG. 21.
FIG. 23 is a side elevational view of another form of dissolvable mold having a neck section in a different position than the neck section of the mold of FIG. 22.
FIG. 24 is a perspective view of an alternate form of dissolvable mold for a portion of a valve chamber.
FIG. 25 is a fragmentary view of the tail end of the completed annular valve housing.
FIG. 26 is a fragmentary partially broken away view of the head end of the completed annular valve housing.

In connection with molds 21 and 23, their bodies are sized to fill the entire associated valve chamber 36. With reference to the FIG. 21 form, the FIG. 23 body being identical, body 96 includes a base surface 100 which is positioned at the head end of the associated valve chamber 36, a radially inward wall surface 102 which defines the filtrate discharge outlet 40, and first and second side wall surfaces 104, 106 which are positioned adjacent the side wall members or plates 80 bounding the valve chamber. In addition, the body includes a radially outermost arcuate wall surface 108 and a top wall surface with two surface portions 110a, 110b, which are generally opposite surface 100. As can be seen in FIG. 22, the radial cross section of the body is the same shape as that of plate 80. Also, moving in a tailward direction from the base surface, surfaces 102 and 108 diverge from one another. In addition, moving in a radially inward direction, surface 110b diverges from surface 100 while surface section 110a converges towards surface 100. Thus, the body 96 is sized and shaped to fill the entire space between plates 80. Furthermore, neck 94 projects outwardly from surface 110b so that when the mold is installed and plastic applied to the neck, the filtrate receiving inlet 39 defined by the plastic coated neck also projects outwardly from surface 110b. This facilitates the attachment of a conduit 48 thereto.

Also, the cross section of body 96 taken in planes parallel to surface 100 comprises a circumferential segment of an annulus. More particularly, this cross section comprises a sector of an annulus because planes containing side wall surfaces 104, 106 intersect at the center of the valve receiving space 42.

The body 96 of the mold is inserted between the plates 80 of its associated valve chamber with the side wall surfaces 104, 106 of the body contacting the respective corresponding surfaces of side wall plates 80 of the valve chamber. Thus, the body aids in defining the circumferential limits of the associated valve chamber. In addition, because neck 94b of the FIG. 24 form of the mold is somewhat larger in dimension than its associated body 96b, it forms a shoulder 97 which abuts the tail edges 86 of the plates and is thereby supported in position by the plates and inserted partially into the space between the plates.

The free ends of the necks of these molds each have a respective cylindrical section 95, 95a, 95b which forms a coupling section of the completed filtrate receiving inlet 39, to which the conduits 48 may be attached.

While the molds may be formed of any dissolvable material which does not also dissolve the plastic, it is preferably of a water soluble sodium nitrate mixture. One suitable mixture is sold as "Paraplast 8100" by Hexel Corporation of Chatsworth, Calif.

The mold 92 is placed in position relative to the plates and at least one layer of plastic 111 is applied to span the outer marginal edges 84 of the plates. In addition, a layer of plastic 112 (FIG. 26) is applied to span the headmost edges 88 of the plates. Also, the exterior surfaces 110a, 110b and neck 94 are covered with plastic. Thus, the outer shell of the annular valve housing is formed by spanning selected marginal edges of the plates 80. In addition, although possible, in the preferred method, plastic is not applied to the radially inward edges 82 of the plates. Consequently, these edges remain exposed to define the limits of the valve seat. This is advantageous because material does not have to be removed from these edges, except as may be necessary to machine or otherwise finish valve seat 42.

Of course, the layers of plastic need not be applied in the order recited above. For example, it is often preferable to coat the neck 94 with plastic prior to installing the mold 92 between the respective plates 80. In addition, edges 84 and 88 can be spanned prior to the placement of mold 92. However, a smoother valve chamber surface results if the mold is installed prior to applying the plastic to all but the neck.

Figures 1, 2, 3, 4, 5, 6, 7:
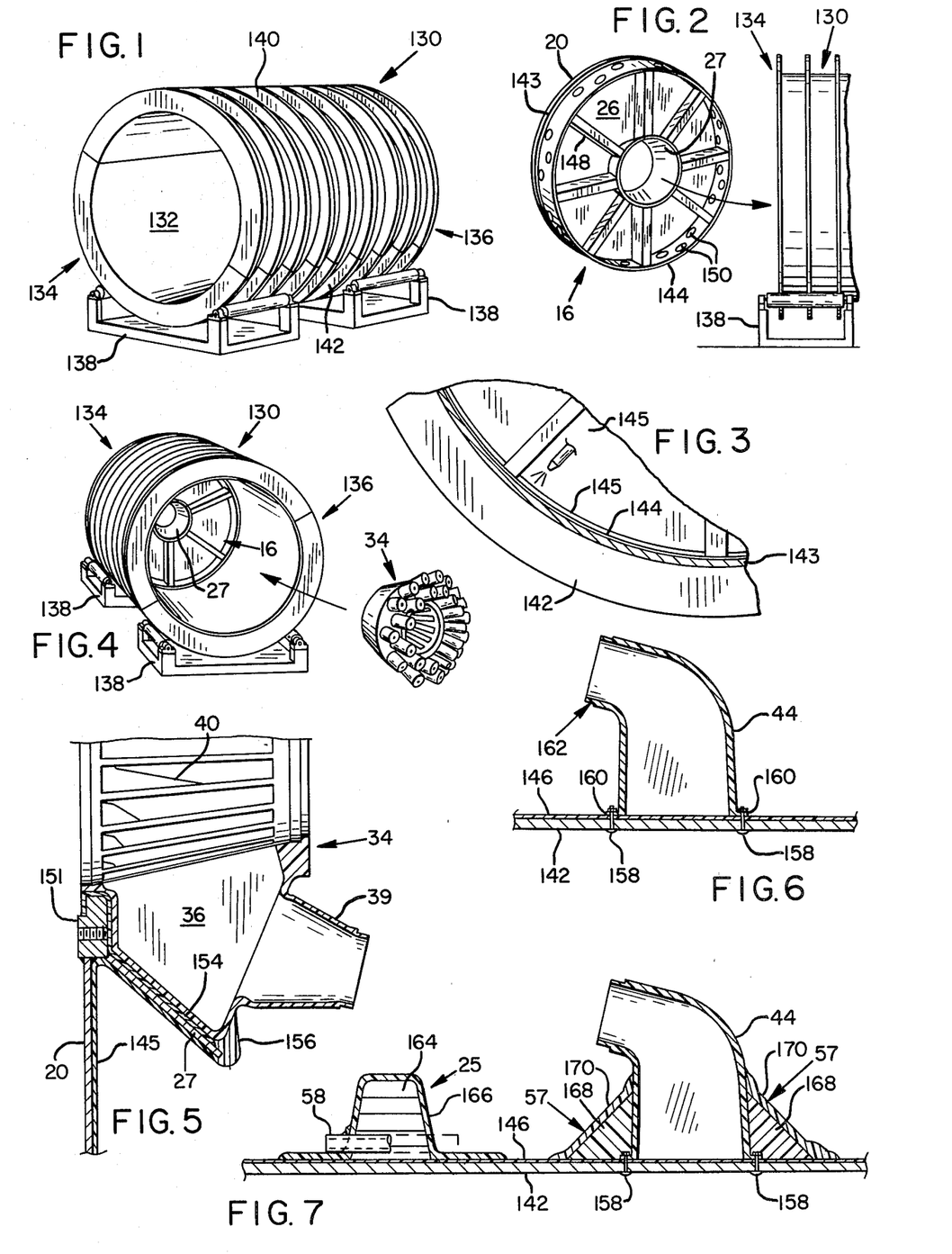
FIG. 1 is a perspective view of a mold for a rotary filter drum.
FIG. 2 is an elevational view of the tail side of a drive head assembly and showing its installation into the mold.
FIG. 3 is a fragmentary enlarged view of a portion of the mold and drive head assembly of FIG. 2, to which a layer of plastic is being applied.
FIG. 4 is a perspective view of the mold and drive head assembly of FIG. 2; taken from the tail end of the mold, showing the installation of an annular valve housing.
FIG. 5 is an enlarged fragmentary view, partially in section, illustrating a portion of the drive head assembly and annular valve housing.
FIG. 6 is a cross sectional view of a bucket section mounted within the mold.
FIG. 7 is a cross sectional view of a bucket section and of reinforcing members installed within the mold.

After the shell is formed, the molds are then dissolved to leave the finished annular valve seat housing shown in FIGS. 4 and 18. Incidentally, it is preferable to alternate molds of the FIG. 22 and FIG. 23 types so that the adjacent filtrate receiving inlets 39 of the valve housing are located at different radial outward positions from the axis of a valve housing. This facilitates the attachment of the drainage tubes 48 by making inlets 39 more accessible. Also, the outer ends of the filtrate inlets may be machined to form a female coupling 120 for insertion within the associated conduits 48 to provide a stronger joint between conduits and valve housing.

It should also be noted that the necks 95, 95a and 95b project tailwardly and generally away from the axis of the valve receiving space because of the angle between surfaces 110b and neck 95 and their relationship to the other surfaces of the mold. This facilitates the transition flow of filtrate through the annular valve housing. Of course, the neck can be located in other position and still accomplish the desired result. For example, the neck could project radially outwardly between the radially outer edges 84 of plates 80, if desired.

Figure 20:
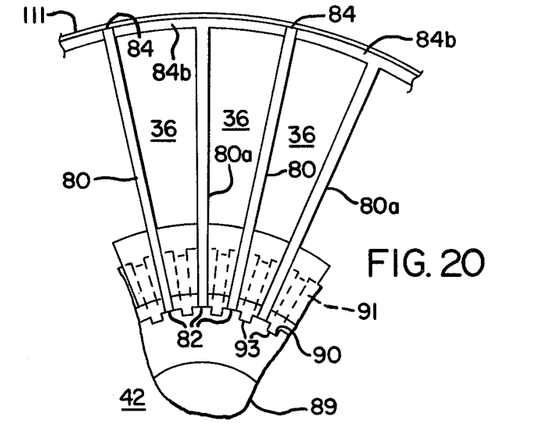
FIG. 20 is a fragmentary view of alternate side wall members of a partially constructed annular valve housing and taken from the tail end of the housing.

With reference to FIG. 20, an alternate form of said wall member is illustrated having a planar radial plastic plate portion 80a, shaped like the plate 80, and an arcuate end portion 84b. End portion 84b extends circumferentially about the axis of the valve receiving space 42 and is bisected by plate portion 84a. The plates 80 and 84a are positioned alternately, as shown in FIG. 20, about the circumference of the central plug 89. Also, the side edges of end portions 84b about adjoining surfaces of the adjacent plates 80. Thus, the arcuate end portions 84b maintain the spacing between the plates at their radially outward edges. In addition, in an alternate method to that illustrated in FIG. 19, flanges 93 of spacer blocks 91 are inserted into the slots 90 of the central plug. The radially inward edges 82 of the plates 80 and of plate sections 84a are thereupon inserted between these spacer blocks to retain them in place.

Detailed Description of the Method of Making the Rotary Drum Filter

With reference to FIG. 1, an elongated mold 130 having a cylindrical interior surface 132 is positioned on rollers 138 so that it can be rotated about its longitudinal axis. Mold 130 has a head end 134 and tail end 136 and is formed of two lengthwise sections 140, 142 releasably joined together. Mold 130 is preferably of wood or other relatively inexpensive, but durable material and is coated with a mold release material to facilitate its easy removal after a shell of the rotary drum filter is formed.

As shown in FIG. 2, drive head assembly 16 is inserted into the head end 134 of the mold. Typically the central portion of drive head assembly 16, or the entire drive head, is of a corrosion resistant material such as stainless steel. Drive head assembly 16 includes a cylindrical flange 144 projecting in a tailward direction from surface 26 of end wall 20. Flange 144 is coaxial with the axis of the drive head assembly but of a slightly smaller diameter than end wall 20. As a result, a lip or ring 143 is provided which serves as a base or support for end ring flange 54. Reinforcing spokes or flanges 148 extend between flange 146 and an annular valve housing receiving seat 27 of the drive head assembly. In addition, plural openings 150 are provided through flange 144 to facilitate bonding of the flange and hence of the drive head assembly to the shell as it is made. The drive head assembly may be primed with a fiber glass resin material to facilitate bonding of plastic to the metal portions of the drive head assembly during subsequent assembly steps.

As can be seen from FIG. 3, the metal components of the drive head assembly are coated with a layer of plastic 145. However, annular valve housing seat 27 need not be coated as it is subsequently overlayed with the valve housing 34. In addition, the interior surface 132 of mold 130 is also coated with a layer of plastic 146 (FIG. 4) to form an interior drum filter shell within the mold. These layers are typically quite thin, such as approximately three-sixteenths of an inch.

With reference to FIGS. 4 and 5, a preformed plastic annular valve housing 34 is inserted through the open tail end 136 of the mold and mounted to the valve housing receiving seat 27 of the drive head assembly. This annular valve housing may be molded in a manner previously explained. A layer of plastic putty 154 is typically applied to the valve seat 27 to secure valve housing 34 in place. An alignment jig may be used to temporarily hold the valve housing in place while the putty cures. Also, a layer of plastic 156 locks the valve housing in place.

Interior plastic bucket sections 44 are temporarily bolted to the mold and shell 146 by bolts 158 (FIG. 6), in their desired positions with their headmost end 162 directed toward a corresponding inlet 39 of one of the valve chambers. Bolts 158 extend through fastening ears 160 of the bucket sections. Material is typically removed from end 162 of the bucket sections, as by machining, to provide a female coupling which can be inserted into the drainage tubes 48 at the time these latter tubes are installed.

To reinforce the thin shell 146 of the drum, reinforcing members such as reinforcing rings 25 are installed within the drum interior. Rings 25 have an annular interior core 164 of a corrosion resistant material. This core may be formed of laminated foam sections, such as of polyurethane foam as shown in FIG. 7, with the sections being attached to the inner surface of shell 146. Alternately, the core may be formed of a corrosion resistant ballast material, such as concrete or sand, to reduce the buoyancy of the drum and corresponding upward pressure on bearings which hold the drum within the pulp slurry bath. Also, drainage tubes 58 are installed transversely through the core for reasons explained above. A layer of plastic material 166 is applied over the core to complete the construction of the reinforcing ring. Typically, the ring nearest the tail end of the drum is not installed until after the installation of the tail assembly 18. Otherwise, depending on the position of the ring relative to the tail section, it may interfere with installation of the tail section itself.

In addition to the reinforcing rings 25, a bucket stiffening ring core 168, which also typically may be of a similar foam or ballast material, is installed adjacent bucket sections 44, both at the head side and tail side of these bucket sections. Core 168 is then overlayed with a layer of plastic material 170 to reinforce the bucket sections and hence shell 146 in the region of the bucket sections. This reinforcing strengthens the shell so that the shell more easily withstands stress as this portion of the drum is weakened by bucket openings 46 which are provided. The core 168 is preferably triangular with the acute angle α between layer 170 and the shell 146 being approximately forty-five degrees to increase the reinforcing capabilities of the bucket reinforcing members 57.

Figure 9:
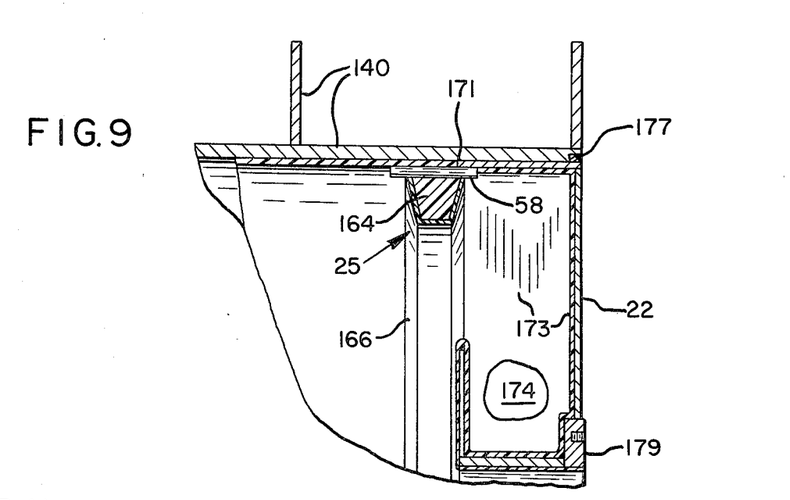
FIG. 9 is a cross sectional view of a tail end portion of the partially constructed rotary drum filter.
Figure 11:
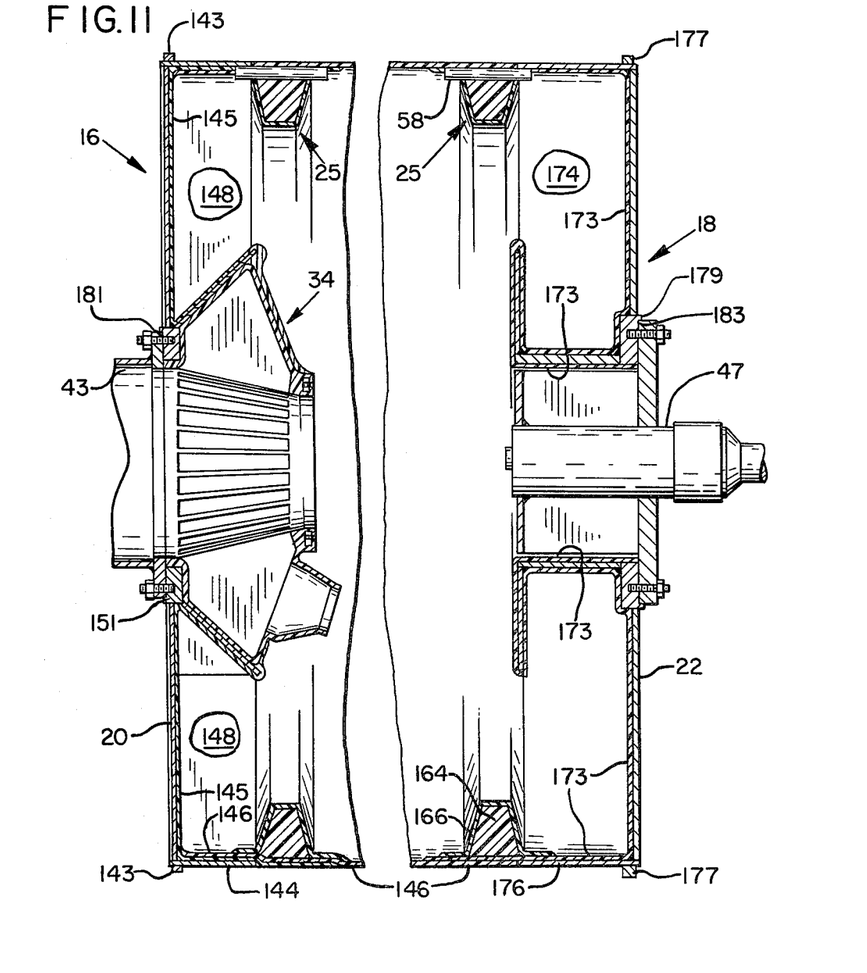
FIG. 11 is a cross sectional view of end sections of the partially constructed rotary filter drum.

In addition, mold 130 may be made longer than the desired finished length of the drum so that shell 146 is also made overlength. Thus, the shell may be trimmed at 171, FIG. 9, to the appropriate desired finished length of the drum. Typically, the deck of the drum is made in ten, twelve, fourteen or sixteen foot lengths. Of course, the deck 24 can be initially manufactured to the desired finished length, but by making the deck overlength and trimming off the excess the manufacture of the deck is easier.

Figures 8, 10, 12, 13, 17:
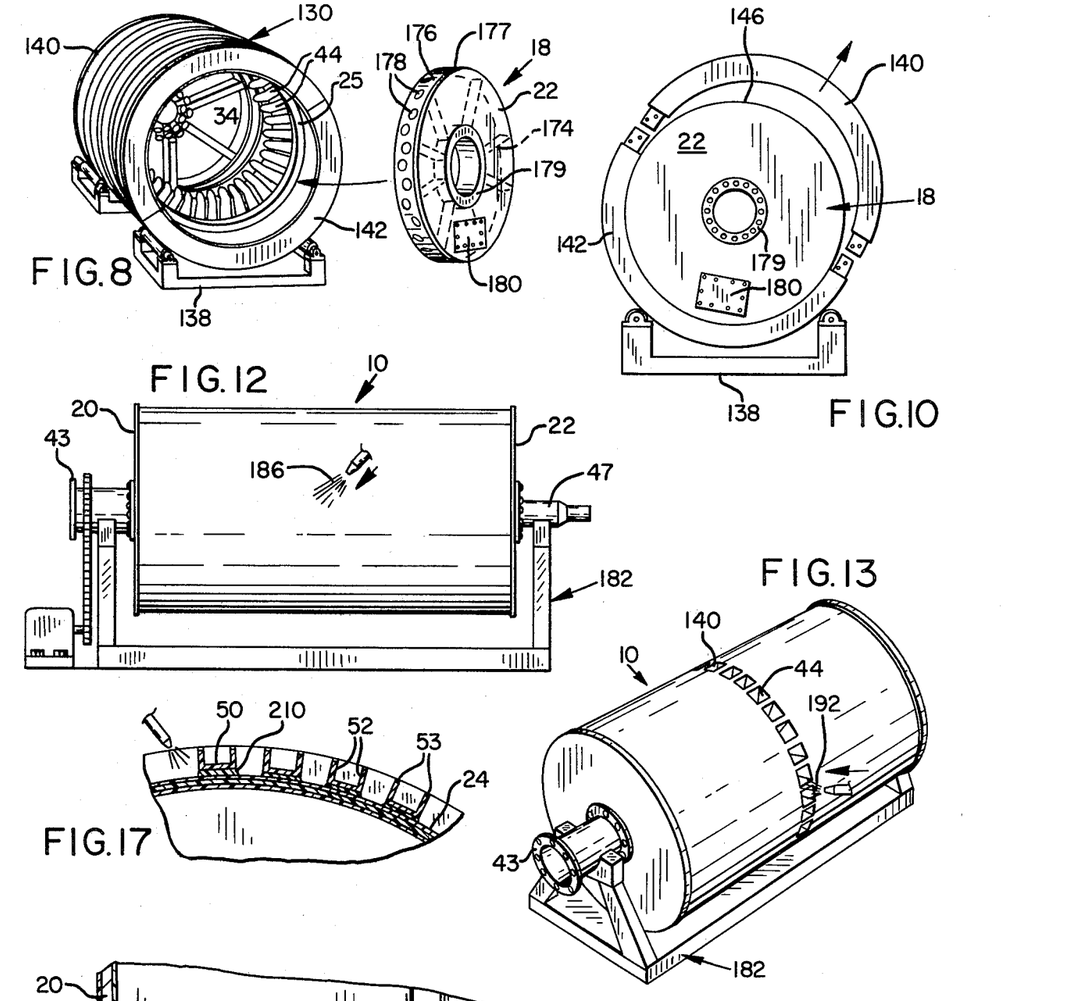
FIG. 8 is a perspective view of the mold and partially constructed rotary filter drum, taken from the tail end of the mold, and showing the installation of a tail assembly.
FIG. 10 is an end view of the partially constructed rotary drum filter showing the removal of the mold.
FIG. 12 is a side elevational view of the partially constructed rotary drum filter mounted on a turning fixture and showing the application of plastic to the external surfaces thereof.
FIG. 13 is a perspective view of the rotary drum filter with bucket openings and showing the application of an additional layer of plastic.
FIG. 17 is a fragmentary partially sectional view of a portion of the external surface of the rotary drum filter showing channel members in place.

With reference to FIG. 8, following trimming of the deck, if required, tail assembly 18 is inserted into mold 130. Tail assembly 18 has reinforcing spokes 174 and a bonding flange 176 through which openings 178 are provided. In addition, the tail assembly has a manhole and cover 180 which provides access to the interior of the drum for maintenance and completion of its construction. Tail assembly 18 also typically includes metal components, such as metal end plate 22 and tail shaft bolt ring 179 to provide a more rigid mounting for the tail shaft 47 (FIG. 18) when installed. A layer of plastic 173 (FIG. 9) is applied to the tail assembly 18, which typically is primed with resin. Layer 173 overlays all metal components of the tail assembly for corrosion resistant purposes. Like the layers previously discussed, layer 173 is typically rather thin and may be approximately three-sixteenths of a inch. Openings 178 through the bonding flange 176 increase the bonding strength of the tail assembly to the shell 146 when layer 173 is applied because plastic flows through these openings and joins the plastic of the shell 146. Also, as mentioned above, the tailmost reinforcing ring 25 may be installed following the installation of the tail assembly if not done previously.

The bolts 158 which secure the bucket sections 44 to the mold are removed and the mold itself is split, as shown in FIG. 10, and removed. This exposes the exterior surface of shell 146. The end faces 20, 22 are machined to remove material as required to establish the precise length of the rotary drum filter. In addition, this trues the opposite end faces so that they are parallel to one another. During this machining, a trunnion seat 181 is formed in a bolt ring 151 of the drive head assembly and a tail shaft assembly seat 183 is formed in the tail assembly bolt ring 179. A removable tail shaft 47 and removable trunnion 43 are mounted to bolt circles 179 and 151 and the drum 10 is set on a turning fixture 182 (FIG. 12). An additional layer of plastic 186 is applied to the exterior surface of the shell 146. Like the previous layer, this latter layer is typically quite thin, for example, approximately three-sixteenths of an inch thick.

It should be noted the steps described above can be performed in other than the above-recited sequence. For example, the reinforcing rings 25, 57 can be installed after the drum is lifted on the turning fixture. However, by installing these members prior to this lifting, the thin shell layer 146 is reinforced. In addition, it is faster to install many of the components within the drum prior to the installation of the tail section, because access to the interior of the drum is easier. Also, the drum shell need not be manufactured utilizing the steps mentioned above, although the above steps are preferred.

Figures 14, 16:
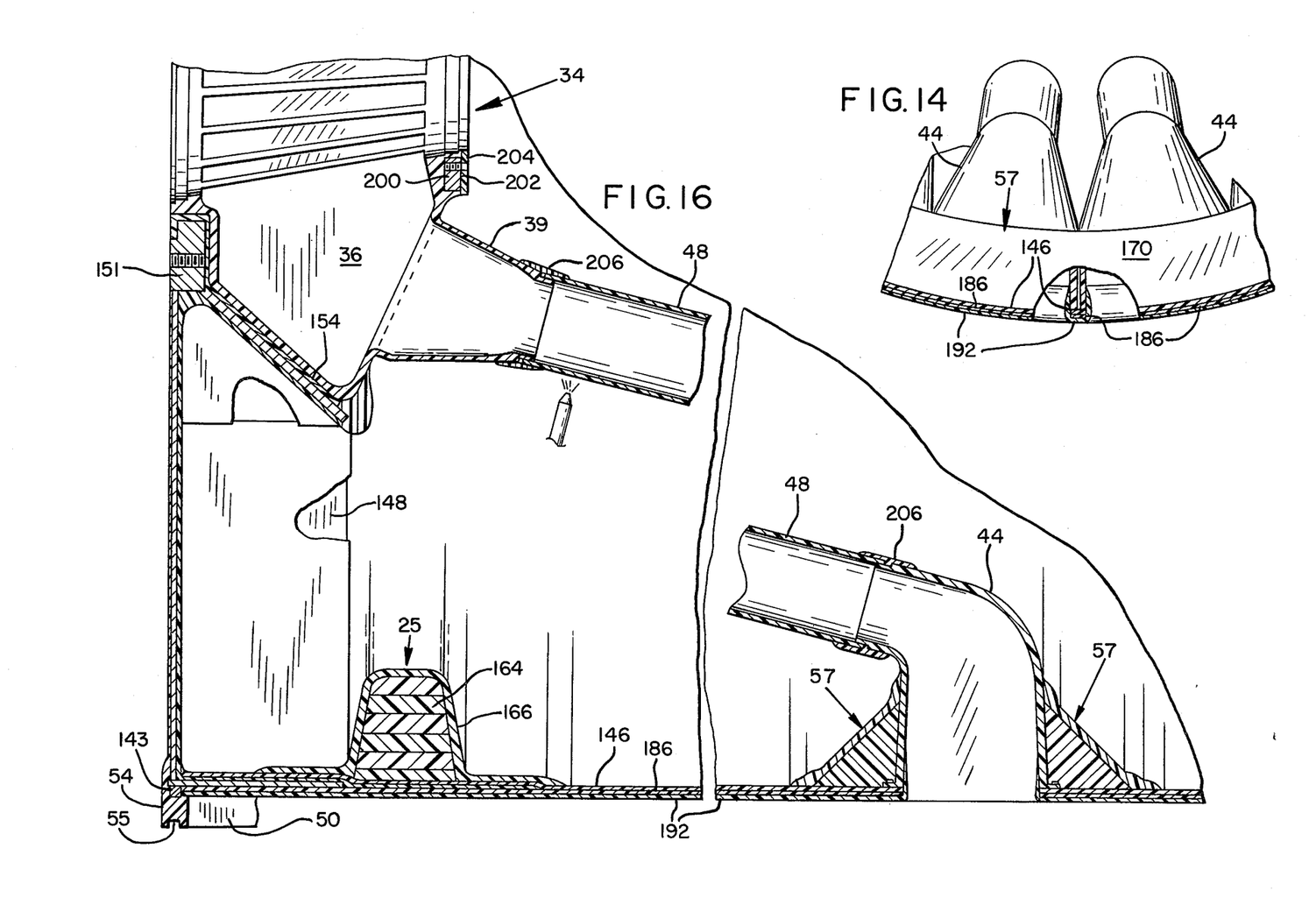
FIG. 14 is an enlarged partially broken away and partially sectional view of installed bucket sections.
FIG. 16 is a partially broken away and partially sectional view of portions of the rotary drum filter showing the installation of plastic conduits together with other steps in the construction method.

As can be seen in FIG. 13, bucket holes 46 are provided through the shell and communicate with the interior of bucket sections 44. Although not required, by postponing the provision of bucket openings 46 until after the bucket rings 57 have been reinforced and the additional layer 186 of plastic is applied, the weakening effect of providing such openings is minimized. Also, the exterior surface of the deck may be coated with still another thin layer of plastic 192 as shown. This layer of plastic may be folded into the rough edges of the bucket openings, as shown in FIG. 14, to smooth these edges and provide for a easier flow of filtrate liquid into bucket sections 44. This step also adds reinforcement to the drum in the region of the bucket openings.

Figure 15:
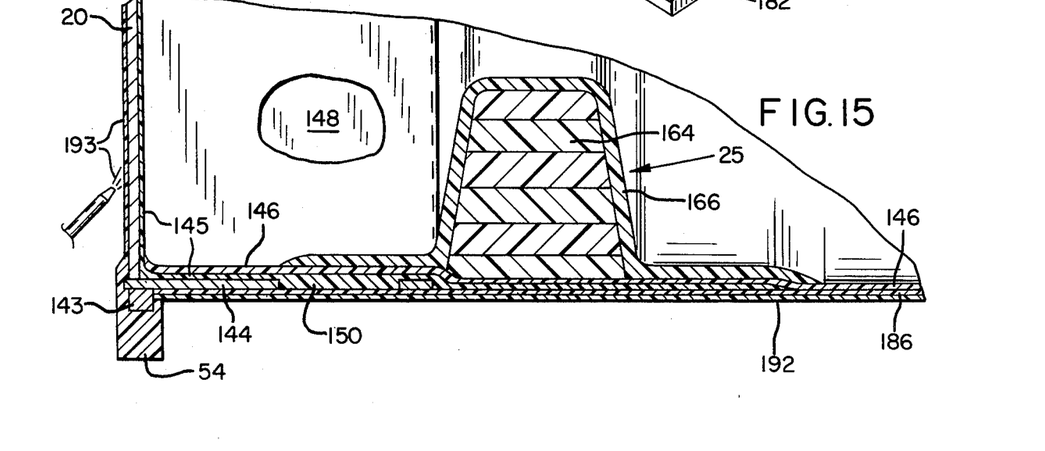
FIG. 15 is a cross sectional view of a portion of the head end of the partially constructed rotary drum filter.

With reference to FIG. 15, the end plates 20, 22 and end flange ring 143, 177 are overlayed with a layer of plastic 193 to protect these surfaces from corrosive filtrate material. Heat may be applied to the rotary drum filter to increase the fullness of curing of the plastic material. Also, the end faces may be checked to insure they are still true and remachined if necessary.

In addition, as shown in FIG. 16, material may be removed, as by machining, from the tailmost surface of the valve housing to provide a seat 200 for installation of a stainless steel bolt ring 202. A cap (not shown) subsequently is mounted to ring 202 to seal the valve seat 42 of the annular valve housing from the interior 32 of the drum. Bolt ring 202 is typically installed with a plastic adhesive putty material and then overlayed with a layer of plastic 204 for corrosion resistance purposes. Following the application of this plastic, removal of material as by machining the plastic layer 204 may be required. A resin coated cap may then be fastened to ring 202.

Although the annular valve housing may be manufactured with a valve seat of the desired accuracy, typically material is removed from the valve seat portion 42 of the housing, as by machining, so that it precisely receives the valve member. The plastic drainage conduits 48 are installed in place to couple the respective filtrate receiving inlets 39 of the valve chambers to the bucket sections. A layer of plastic 206 is applied at the joints of these elements to prevent leakage and provide added reinforcement.

Plastic crossover tubes 60 and a plastic pick-up tube 66 are then typically installed and held in place by plastic bands, not shown. All of the interior surfaces of the drums, now being preferably either of plastic or metal coated with plastic, are conveniently coated with a full cure surface agent commonly used in the fiber glass reinforced plastic industries. Such a full cure surface agent typically comprises a mixture of fiber glass resin and one-half to one percent paraffin wax which seals the resin from ambient air so that the resin cures uniformly throughout.

End ring flanges 54 are machined to their rough outside diameter and the bucket sections 44 are coated with a full cure surface agent. In addition, as shown in FIG. 17, channels 50 are installed to the exterior surface of deck 24, for example, by a layer of plastic material 210. These channels are positioned so that the spacing between adjacent ribs 52 of adjacent channels is approximately equal to the spacing between the ribs 52 of a single channel. Thus, the filtrate compartments defined by these channels are approximately equally dimensioned. The exterior surface of deck 24 and the channels may also be coated with a full cure surface agent to enhance curing. Channels 55 may then be formed, as by machining, into end rings 54. Also, the exterior diameter of the finished drum is established by machining the ends of ribs 52. In addition, grooves 232 (FIG. 17) may be cut in the channels for wires 54, if requested by the customer, and the screen 56 overlayed on the wires. The channels 55 accommodate a fastener for the screen.

In addition, covers 234, 236 may be installed at the respective head and tail ends of the drum and coated with plastic to protect the bolts which attach the trunnion and tail shaft to the drum. These cover plates may also be coated with a resin material to increase their corrosion resistance.

Having illustrated and described the principles of my invention with reference to several preferred methods and embodiments, it should be apparent to those skilled in the art that such invention may be modified in arrangement and detail without departing from such principles. I claim as my invention all such modifications which come within the true spirit and scope of the following claims.

I claim:

1. A method of making an axial annular valve housing for a rotary drum filter of the type having internal drainage conduits which deliver filtrate to the valve housing, the valve housing having a head end portion adjacent one end of the filter drum and a tail end portion and defining a central valve receiving space and plural individual valve chambers, each valve chamber having a filtrate inlet adapted for coupling to an associated one of the drainage conduits and a filtrate discharge outlet through which filtrate is discharged to the valve receiving space, such that the intermittent application of a vacuum at the filtrate discharge outlet of each valve chamber in response to a valve member positioned within the valve receiving space draws filtrate from the associated drainage conduit, through the valve chamber and filtrate discharge outlet and to the valve receiving space, comprising:

positioning radial plastic valve chamber side wall members about the axis of the valve receiving space such that the radially inward edges of said side wall members define the limits of the valve receiving space and such that said side wall members define the circumferential limits of the valve chambers;

placing plural individual dissolvable filtrate inlet defining molds in position such that each such mold is associated with a respective one of the valve chambers and is located in the space reserved for the filtrate inlet opening of the associated valve chamber;

applying a layer of plastic to the filtrate inlet defining molds and to span selected marginal edges of said side wall members so as to interconnect said side wall members and form the outer shell of the annular valve housing; and dissolving the filtrate inlet defining molds.

2. A method of making a valve housing according to claim 1 in which the step of placing filtrate inlet defining molds comprises the step of inserting each mold at least partially into its associated valve chamber with a portion of the inserted mold in contact with the side wall members defining the circumferential limits of the associated valve chamber such that the mold facilitates the maintenance of the circumferential spacing of the side wall members as the layer of plastic is applied.

3. A method of making a valve housing according to claim 1 in which the step of placing filtrate inlet defining molds comprises the step of supporting each of said molds by the side wall members defining the circumferential limits of the valve chamber associated with the supported mold.

4. A method of making a valve housing according to claim 1 in which the step of placing filtrate inlet defining molds comprises the step of inserting a valve chamber occupying portion of each said mold within the associated valve chamber.

5. A method of making a valve housing according to claim 1 or 4 in which the radially inward edges of said side wall members are not among the selected marginal edges spanned during the step of applying a layer of plastic such that such edges are exposed and bound the valve receiving space.

6. A method of making a valve housing according to claim 1 in which the step of placing filtrate inlet defining molds comprises the step of filling each valve chamber entirely with a valve chamber occupying portion of the associated mold, the radially inwardmost portion of said valve chamber occupying portion defining the limits of the filtrate discharge opening.

7. A method of making a valve housing according to claim 1, 2 or 4 in which each of said filtrate inlet defining molds includes a neck portion for defining a generally tailward projecting filtrate inlet in the form of a conduit adapted for coupling to the associated drainage conduit, the step of placing filtrate inlet defining molds comprising the step of placing said molds such that the neck of each such mold projects generally tailward of the associated side wall members.

8. A method of making a valve housing according to claim 7 in which the step of placing filtrate inlet defining molds comprises the step of placing said molds such that the necks of adjacent molds are staggered so as to define filtrate inlet openings at staggered radial positions from the center of the valve housing.

9. A method of making a valve housing according to claim 1 in which the step of positioning radial plastic valve chamber side wall members comprises the step of positioning side wall members comprising radial planar plastic plates.

10. A method of making a valve housing according to claim 1 in which the step of positioning radial plastic valve chamber side wall members comprises the step of alternately positioning side wall members comprising radial planar plastic plates and side wall members comprising a radial plastic plate portion and an arcuate end wall portion such that the radial plastic plates and radial plastic plate portions define the circumferential limits of the valve chambers and the arcuate end wall portions define the radially outer limits of valve chambers.

11. A method of making a valve housing according to claim 1 including the step of providing a central plug positioned in the central valve receiving space, the plug having plural circumferentially spaced slots in its outer surface, the axis of each slot being in the plane containing the axis of the plug, and in which the step of positioning radial plastic valve chamber members comprises the step of inserting a radially inward edge of each said side wall member into an associated one of the slots.

12. A method of making a valve housing according to claim 1 including the step of providing a central plug positioned in the central valve receiving space, the plug having plural circumferentially spaced slots in its outer surface, each slot being in the plane containing the axis of the plug, the step of mounting plural spacer blocks to the plug, each such block having a flange which is inserted within an associated one of the slots and side surfaces spaced from corresponding side surfaces of its adjacent spacer blocks such that the adjacent side surfaces define a side member receiving space therebetween, and in which the step of positioning radial plastic valve chamber members comprises the step of inserting a radially inward edge of each said side wall member into an associated one of the side member receiving spaces.

13. A method of making a valve housing according to claim 11 or 12 including the step of removing the central plug.

14. A method of making an axial annular valve housing for a rotary filter drum of the type having internal drainage conduits which deliver filtrate to the valve housing, the valve housing defining a central valve receiving space and plural individual valve chambers, each valve chamber having a filtrate inlet adapted for coupling to an associated one of the drainage conduits and a filtrate discharge outlet through which filtrate is discharged to the valve receiving space, such that the intermittent application of a vacuum at the filtrate discharge outlet of each valve chamber in response to a valve member positioned within the valve receiving space draws filtrate from the associated drainage conduit, through the valve chamber and filtrate discharge outlet and to the valve receiving space, comprising:

providing a frustoconical central plug positioned in the central valve receiving space with the smallest diameter of the plug tailward of the largest diameter of the plug, the plug having plural circumferentially spaced slots in its outer surface, each slot being in the plane containing the axis of the plug;

positioning radial plastic valve chamber side wall members about the axis of the valve receiving space such that the radially inward edges of said side wall members define the limits of the valve receiving space and such that said side wall members define the circumferential limits of the valve chambers, the step of positioning said valve chamber side wall members including the step of inserting a radial inward edge of each said side wall member into an associated one of the slots;

placing plural individual dissolvable filtrate inlet defining molds in position such that each such mold is associated with a respective one of the valve chambers by inserting a valve chamber occupying portion of each mold into the associated valve chamber with a filtrate inlet defining neck portion of the mold projecting generally tailward into the space reserved for the filtrate inlet opening of the associated valve chamber;

applying a layer of plastic to the filtrate inlet defining molds and to span the marginal edges of said side wall members except for those edges bounding the valve receiving space so as to interconnect said spanned side wall members and form the outer shell of the annular valve housing;

removing the central plug; and dissolving the filtrate inlet defining molds.

* * * * *